Patented Dec. 16, 1924.

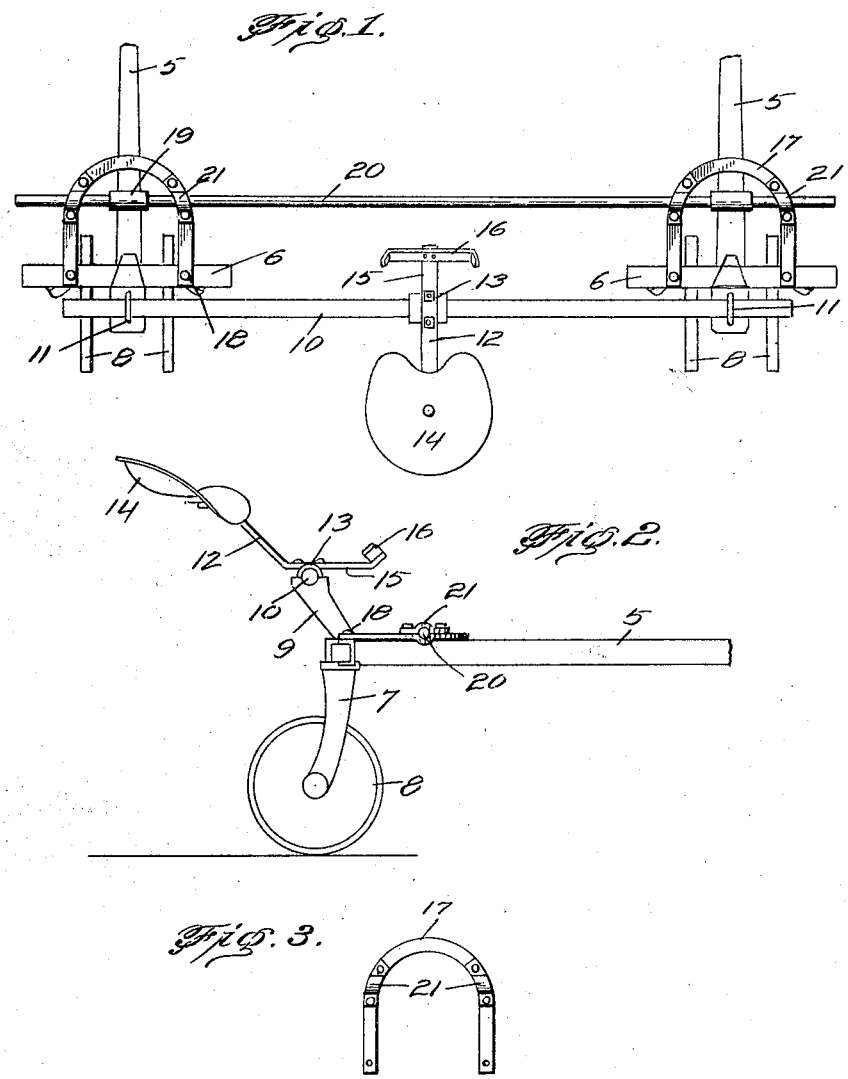

1,519,596

UNITED STATES PATENT OFFICE.

FRED SPECHT, OF CALLAWAY, NEBRASKA.

CULTIVATOR ATTACHMENT.

Application filed September 10, 1923. Serial No. 661,874.

*To all whom it may concern:*

Be it known that I, FRED SPECHT, citizen of the United States, residing at Callaway, in the county of Custer and State of Nebraska, have invented certain new and useful Improvements in Cultivator Attachments, of which the following is a specification.

This invention relates to certain new and useful cultivator attachments, and has particular reference to a means for rendering more satisfactory and efficient, the type of cultivator set forth in U. S. Patent #868,107, C. H. Melvin, dated October 15, 1907.

Cultivators of the type above referred to comprise separate transversely spaced cultivating units, which are adjustable toward and from each other upon a tie bar. From experience it has been observed that these patented devices are not as sturdy as they might be, and it has been my experience to have the machine upset. This is probably due to the improper balancing of the structure. It has been observed also that the structure is not sufficiently rigid to resist the undesirable feature of permitting the cultivator to ride out of the row. Then, too, difficulty is experienced in turning the machine to travel in the reverse direction at the ends of the rows. In order to overcome the difficulty which now confronts the users of the patented machine referred to, I have evolved and produced an attachment which can be applied to this type of cultivator without requiring alterations, the same being of such a construction that it amply reinforces and braces the structure to produce an exceedingly rigid machine.

A further object of the invention is to attain the before mentioned objects by means of a simple, durable, and otherwise practical construction, capable of convenient and ready attachment to existing cultivators of the mentioned type.

Other objects will appear as the nature of the invention is better understood, and the same consists in the novel form, combination, and arrangement of parts hereinafter more fully described, shown in the accompanying drawing and claimed.

In the drawing, wherein like reference characters indicate corresponding parts throughout the several views:

Figure 1 is a top plan view, partly broken away of two row lister cultivator, with parts removed, showing the same provided with an attachment constructed in accordance with the present invention.

Figure 2 is a side elevational view of the device shown in Figure 1, and

Figure 3 is a plan view of one of the U-shaped straps or bows.

Referring more in detail to the drawing, the form of the type of cultivator to which my attachment is to be applied, embodies a frame including a pair of longitudinal spaced parallel draft tongues or beams 5 to the rear ends of which are attached cross bars 6, having depending standards 7, upon the lower ends of which are mounted the ground engaging or supporting wheels 8, suitable upwardly projecting standards 9 being provided upon the rear ends of the tongues 5 and connected by a transverse frame bar 10. The connections of the ends of the frame bar 10 with the standards 9 are indicated at 11, and permit lateral adjustment of the two cultivator units relative to each other so as to adjust the device to the particular distance encountered between the rows, it being understood that each beam and its cross bar 6 is referred to as a cultivator unit. It is to be understood that the cultivating implements are adapted to be suitably carried by the cross bars 6 at each side of the machine as shown in the above mentioned patent. The cultivator also embodies a standard 12, suitably clamped as at 13, upon the central portion of the frame bar 10 or rod 10 and carrying at its upper end a seat 14 for accommodating the operator, the standard 12 being provided with an extension 15 that projects forwardly of the rod 10 and carries a foot rest 16. The usual double trees (not shown) are supposed to be attached to the tongues 5 directly in front of the operator for hitching the draft animals to the cultivator.

My improved attachment embodies a pair of U-shaped straps or bows 17, each of which is disposed upon one of the cultivator units with the central forward portion of the same resting upon the top of the adjacent tongue 5 and with the rear end thereof secured as at 18 upon the ends of the adjacent cross bar 6 at opposite sides of said tongue. Suitably fixed to the tongues 5 forwardly of the forward intermediate portion of the bows 17 are sleeves 19 that are arranged in transverse alignment and through which slidably projects the ends of the rod 20 which may be hollow or solid as preferred. The rod 20 also projects through slide bearings 21 carried by the legs of the bows 17 in alignment with the sleeves 19, and it will thus be seen that the cultivator units may be adjusted toward and away from each other, by reason of the fact that the sleeves 19 will slide upon the rod 20, as will also the bearings 21 of the bows. The rod 20 is thus disposed in front of the feet of the operator so as to protect him from being kicked by the draft animal. The tongues 5 are also rigidly connected against twisting strains upon a vertical axis relative to each other, so that the cultivator may be more readily turned around at the ends of the road, and due to the connection of the bars 17 with the cultivator unit and the rod 20, a more rigid construction is provided whereby upsetting of the machine is rendered unlikely and the operation of the cultivator on a side hill is made better.

It has been found in actual practice that the present invention renders the cultivator greatly improved in the above respects and the construction of the invention is simple and durable so as to be capable of being cheaply and easily manufactured and placed into use.

Minor changes may be made without departing from the spirit and scope of the invention as claimed.

What I claim as new is:

1. In combination with a two row lister cultivator embodying a pair of wheeled cultivator units, each embodying a draft tongue having a rear cross bar and adjustably connected for movement toward and away from each other by means of a frame bar, bow members with rearwardly projecting legs arranged with their central portions upon the tongues and having their rear ends secured to the cross bars at opposite sides of the tongues, and a rod arranged transversely of the cultivator and having slidable connection with the legs of the bows and with the tongue.

2. In combination with a two row lister cultivator embodying a pair of wheeled cultivator units, each embodying a draft tongue having a rear cross bar and adjustably connected for movement toward and away from each other by means of a frame bar, bow members with rearwardly projecting legs arranged with their central portions upon the tongues and having their rear ends secured to the cross bars at opposite sides of the tongues, a rod arranged transversely of the cultivator and having slidable connection with the legs of the bows and with the tongue, the slide connection between the tongues comprising sleeves fixed upon the tongues through which said rod projects.

3. In combination with a two row lister cultivator embodying a pair of wheeled cultivator units, each embodying a draft tongue having a rear cross bar and adjustably connected for movement toward and away from each other by means of a frame bar, bow members with rearwardly projecting legs arranged with their central portions upon the tongues and having their rear ends secured to the cross bars at opposite sides of the tongues, a rod arranged transversely of the cultivator and having slidable connection with the legs of the bows and with the tongue, the slide connection between the tongues comprising sleeves fixed upon the tongues through which said rod projects, and the slidable connection between said rod and the legs of the bows embodying slide bearings carried by the latter.

4. An attachment for a plural row lister cultivator comprising a brace rod adapted to extend transversely between the separable units of the cultivator, said bar to extend beyond and across the draft bars of said unit, a pair of substantially U-shaped members adapted for disposition adjacent the opposite ends of said bar, the arms of said members being provided with semi-circular seats for reception of that portion of the bar which crosses them, retaining clamps detachably connected to said arm and passing over the end portions of the bar to retain the latter in the seat, means for fastening the inner free ends of the arms of said members at the portions of said cultivator units, and guide sleeves arranged between the arms of each of said members, the end portions of said bars passing slidably through said sleeves.

In testimony whereof I affix my signature.

FRED SPECHT.